Jan. 14, 1936.  S. G. MYERS ET AL  2,027,926
GUNFIRE DIRECTOR SYSTEM
Original Filed March 16, 1929  6 Sheets-Sheet 1
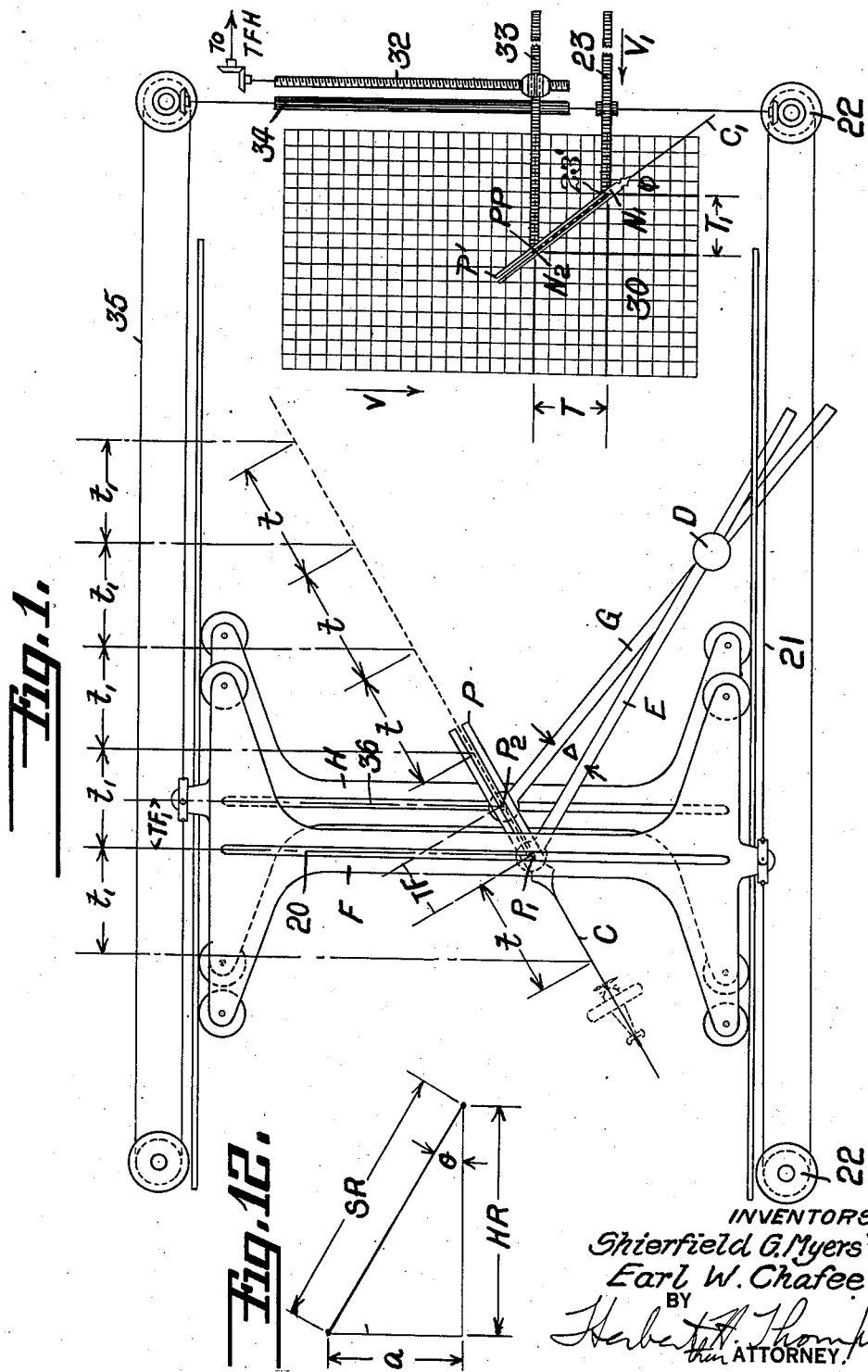
INVENTORS.
Shierfield G. Myers and
Earl W. Chafee
BY
Herbert A. Thompson
their ATTORNEY.

Jan. 14, 1936.  S. G. MYERS ET AL  2,027,926
GUNFIRE DIRECTOR SYSTEM
Original Filed March 16, 1929  6 Sheets-Sheet 2
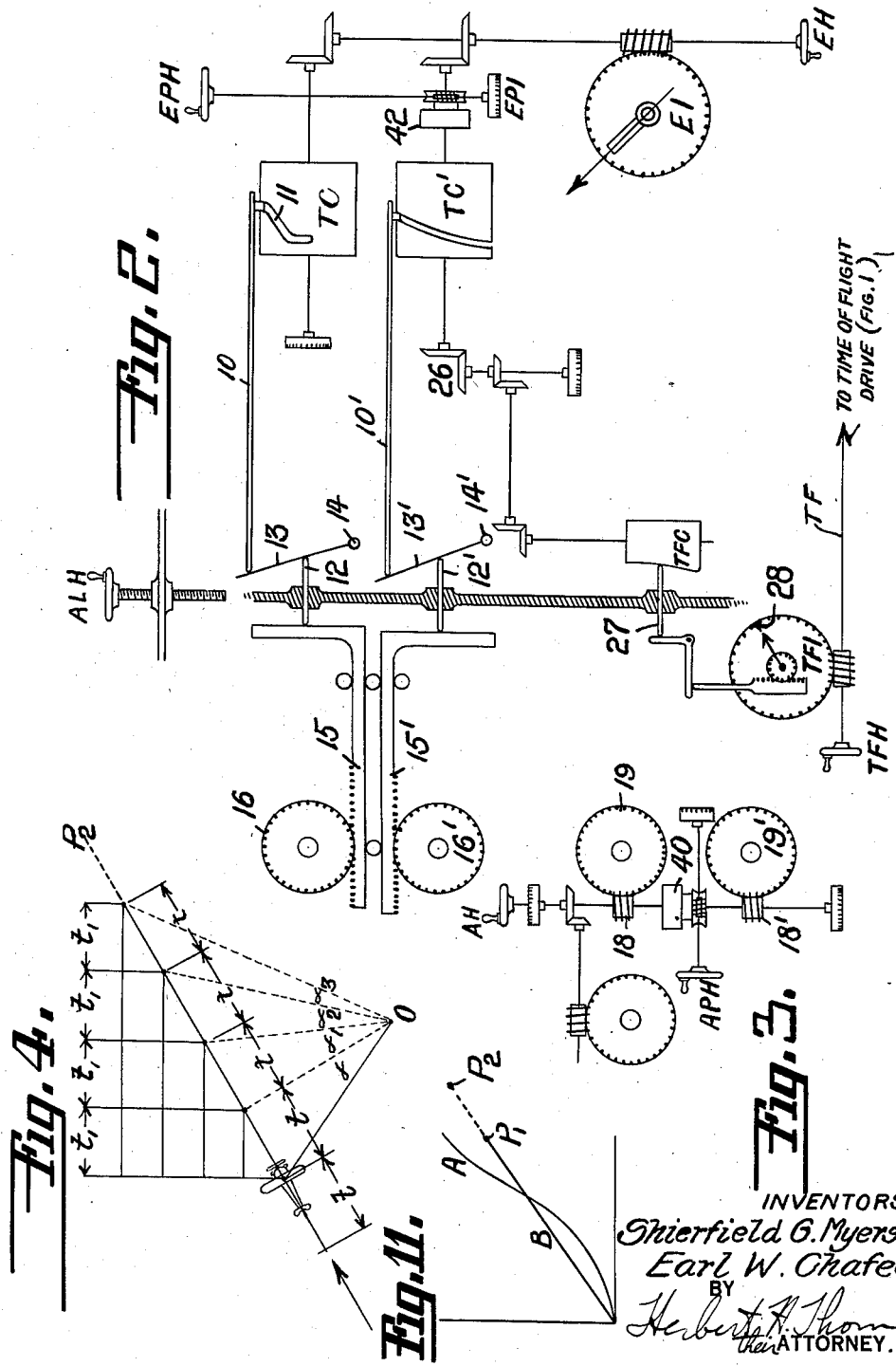
INVENTORS
Shierfield G. Myers and
Earl W. Chafee
BY
Herbert H. Thompson
their ATTORNEY.

Jan. 14, 1936.  S. G. MYERS ET AL  2,027,926
GUNFIRE DIRECTOR SYSTEM
Original Filed March 16, 1929   6 Sheets-Sheet 3

INVENTORS.
Shierfield G. Myers
Earl W. Chafee
BY
Herbert H. Thompson
their ATTORNEY.

Jan. 14, 1936.        S. G. MYERS ET AL        2,027,926
GUNFIRE DIRECTOR SYSTEM
Original Filed March 16, 1929    6 Sheets-Sheet 4
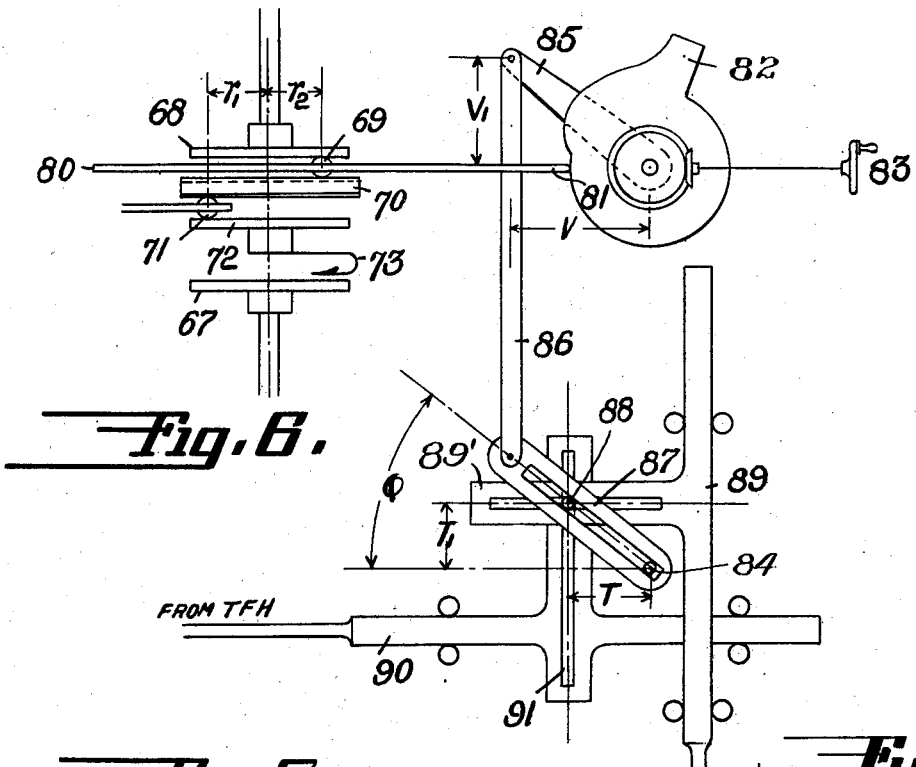
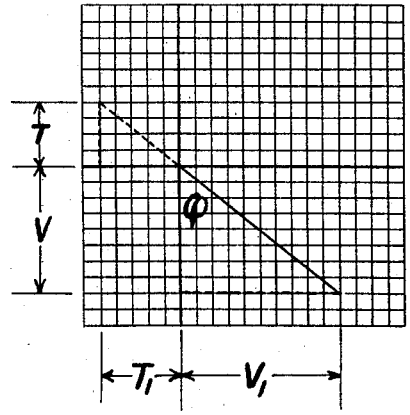
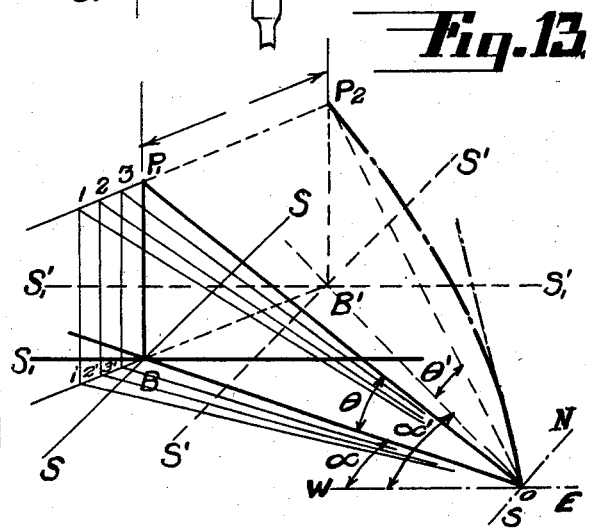
INVENTORS.
Shierfield G. Myers
Earl W. Chafee
BY
Herbert N. Thompson
ATTORNEY.

Jan. 14, 1936.    S. G. MYERS ET AL    2,027,926
GUNFIRE DIRECTOR SYSTEM
Original Filed March 16, 1929    6 Sheets-Sheet 5

INVENTORS.
Shierfield G Myers
Earl W Chafee
BY
Herbert H. Thompson
their ATTORNEY Jan. 14, 1936.    S. G. MYERS ET AL    2,027,926
GUNFIRE DIRECTOR SYSTEM
Original Filed March 16, 1929    6 Sheets-Sheet 6

INVENTORS.
Shierfield G. Myers
Earl W. Chafee.
BY
Herbert H. Thompson
ATTORNEY.

Patented Jan. 14, 1936

2,027,926

UNITED STATES PATENT OFFICE 2,027,926

GUNFIRE DIRECTOR SYSTEM

Shierfield G. Myers, Freeport, and Earl W. Chafee, Brooklyn, N. Y., assignors to Sperry Gyroscope Company, Inc., Brooklyn, N. Y., a corporation of New York Application March 16, 1929, Serial No. 347,587
Renewed March 9, 1935

20 Claims. (Cl. 235—61.5)

This invention relates to position predictors, or more fully stated, means for predicting the future position of a target whose course can be determined. It is an object of our invention to provide a predictor which may operate on the principle of mechanically reproducing to scale the actual course travelled by the target so as either to obtain a record of the course or to provide a predictor which may operate without an actual graphic plot or record of the course. Our invention has particular applicability to anti-aircraft defense in which the target is usually a bomb-dropping aircraft.

In all problems of position prediction as related to anti-aircraft defense it is assumed that the target flies a straight course at a constant speed and altitude during the predicting interval. This assumption is warranted because the target in anti-aircraft defense is usually a bomb-dropping aircraft which must fly a straight course at a constant speed in order that it may drop its bombs on its selected objective (except in dive bombing). In devices of this kind it has heretofore been the practice to keep a telescope trained on the target and measure the angular rate of travel. Thus, for instance, referring to Fig. 4 of the drawings herein, it will be seen that the points 1—2—3, etc. indicate elapsed equal intervals of time, while the angles $\alpha$, $\alpha_1$, $\alpha_2$, etc. indicate the angular distance traversed in said intervals of time as viewed from the observing position O. It will now be seen that these angles vary with the position of the target with respect to the observing position O and that although the intervals of time are equal, and although the target travels equal distances $t$ in such intervals of time, the angular distances vary from one period to the next depending upon the relative position of the target to the observing position O. If now the course is plotted with time as one coordinate and the angular distance travelled as the other coordinate, it will become apparent that a curved line will result because a constant quantity is being measured against a variable quantity. This has been the condition heretofore in the predictors now generally in use. If now it is remembered that the predicted course is always determined from the actual course, since obviously the future position of a target is merely an extension of its present position, it will be seen that where the plotted course is a curved line it is practically impossible to predict with any accuracy the future position, since it is impossible to tell what degree of curvature will be present at a future time. This is quite clearly shown in Fig. 11 wherein the curved line indicates such a course and the observer is left to guess as to just what direction the course will take at a future point.

It will be at once apparent that if a course could be plotted that would bear such relation to the actual course that a straight line would be obtained if a straight course was being maintained by the target, it would be a very simple matter to predict the future position of the course, since such position must necessarily also be in said straight line. This likewise becomes apparent from a study of Fig. 11 wherein the predicted position is shown as a continuation of the straight line course B as distinct from the curved course A. Therefore, we may sum up as the novel principle of operation of our invention that we plot or otherwise determine the actual course or track of the target so that when said target assumes a straight course, which it must do for its bomb dropping operations, we can determine the predicted position of said course by merely setting said position ahead in said straight line course.

We are enabled to obtain a plot as hereinbefore mentioned by utilizing not the angular movement of the target as observed at equal intervals of time, but linear ranges between observing position O and the target and the linear rate of movement of the craft along its course. It will be seen that if the ranges between O and points 1—2—3 etc. are plotted while swinging the telescope in azimuth to keep on the target, that the ends of the lines O—1, O—2, O—3 must trace the actual course of the target which will be a straight line if the target is traveling a straight course and will be curved only when the target is actually traveling on a curved course. By this means, therefore, we can readily determine when the craft has reached its straight line course, since it is only then that the target is flying a bomb-dropping course, and it is only then that the future course can be predicted with accuracy. In order to obtain the ranges, we utilize the fact that at a given altitude the range, either slant range or horizontal range, is a function of the angle of elevation. Thus in Fig. 12, with a given altitude $a$, the slant range SR and the horizontal range HR are both functions of the angle of elevation, $\theta$, so that tan $\theta$ equals $$\frac{a}{HR}$$

or sin $\theta$ equals $$\frac{a}{SR}$$

The altitude can be determined by a height or range finder HF, which is an optical device well known in the art and with the details of which this invention is not concerned and the angle of elevation is known at the observing station so that either range can thus be obtained. Since the horizontal projection of the plot as determined by slant ranges will also be straight or curved as the course of the target is straight or curved, we prefer to work from said horizontal projection, and by plotting the said ranges at equal intervals of time, meanwhile turning the telescope through the angles $\alpha$, $\alpha_1$ etc., and by using the azimuthal angular movements of the telescope the ends of the lines indicating said horizontal ranges must necessarily lie in the straight ground course of the target if the target is flying a straight line course. As explained above, it is then a simple matter to predict the future position of the target in the horizontal plane since said position must necessarily lie at a given distance ahead on said straight line course. The exact distance ahead is determined by the time of flight which it takes a projectile to travel from the observing position O to the predicted position P₂ multiplied by the rate of travel of said target. Having located this predicted position in the horizontal plane, it is a simple matter to locate the target since the altitude is known.

The means for determining the straight line course as above described and for setting the predicted position in said course will now be fully described in the detailed specification which follows:

In the accompanying drawings

Fig. 1 is a plan view of one form of our invention wherein the course of the target is graphically plotted.

Fig. 2 is a diagrammatic assembly view of the operating mechanism for controlling the pointers of Fig. 1.

Fig. 3 is another diagrammatic view of additional operating mechanism for the pointers of Fig. 1.

Fig. 4 is a diagram illustrating the theory of this invention as described hereinbefore.

Fig. 6 is an enlarged detail of one of the means for mechanically determining the course of the target.

Fig. 7 is a diagrammatic view illustrating the theory of operation of the Fig. 5 form of this invention.

Fig. 8 is a diagrammatic assembly view showing the operating mechanism of the Fig. 5 form of the invention.

Fig. 10 is a diagrammatic view of a modification of the time-of-flight mechanism shown in Fig. 8.

Fig. 11 is a graphic representation of the principles underlying this invention, as already set forth hereinbefore.

Fig. 12 is another diagram illustrating the principle of operation of the invention, as already set forth hereinbefore.

Fig. 13 is a diagram illustrating the theory underlying applicants' invention, with especial reference to the second form of the invention as shown in Figs. 5 to 8, inclusive.

Figure 9:
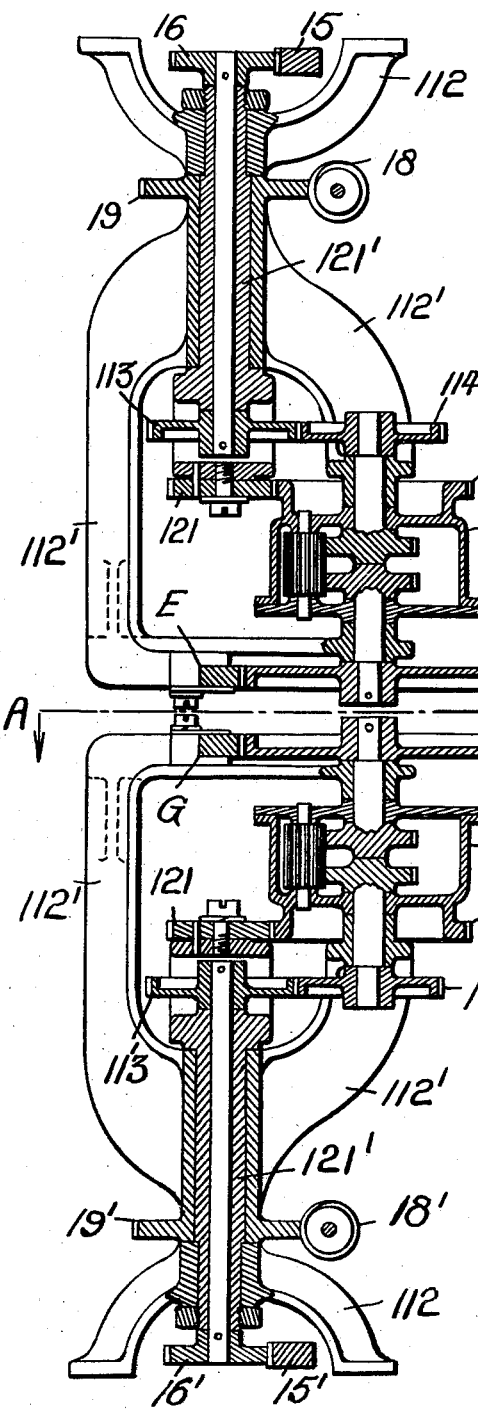
Fig. 9 is a detail view of a differential compensating mechanism employed in the Fig. 2 form of the invention.

Referring now to the Figs. 1 to 4 form of the invention, as it embodies principles already set forth in detail hereinbefore, it will be seen that means are provided for plotting the actual straight ground course which the target is flying, in the Fig. 4 diagram for instance. The elevation tracker at the observing station O keeps the elevation telescope ET trained on the target by operating an elevation handwheel EH (Figs. 2 and 8) thus introducing the angle of elevation $\theta$ into the instrument. Knowing this angle, the horizontal range HR may be determined since, as shown above, $$HR = \frac{a}{\tan \theta}$$

or in other words, the range varies directly as the altitude and inversely as the tangent of the angle of elevation. We set in this range by an arm E pivoted at D so that the length of arm E from D to point P₁ is the equivalent of the horizontal range O—1, O—2 etc. as shown in Fig. 4. The length of this arm E from D to P₁ is determined from the elevation handwheel EH operating through suitable gearing to a tangent cam TC which actuates a slide 10 in accordance with a function of the tangent of the angle of elevation as determined by the cam slot 11. Said slide 10, which is in the form of a link, operates upon a pin 12 through a lever 13 pivoted at 14. The throw of pin 12 due to a given movement of link 10 depends, of course, upon the position of pin 12 with respect to the pivot 14 of said lever 13. It will be obvious that as pin 12 is moved away from pivot 14 and toward link 10 that the throw of pin 12 increases, while if said pin 12 is moved away from link 10 and toward pivot 14, the throw of said pin 12 will be lessened. The position of pin 12 with respect to pivot 14 is determined by the altitude handwheel ALH which is operated in accordance with the altitude. So that the throw which is transmitted to pin 12 is, therefore, proportional to the proper function of the tangent of the angle of elevation as determined by the position of the tangent cam TC and is proportional also to the altitude as determined by the position of pin 12 with respect to pivot 14. The movement of pin 12 is, therefore, directly proportional to the horizontal range and this movement is transmitted through a suitable rack 15, gearing 16, to a rack-bar E (see Fig. 9) to move the same linearly in accordance with the horizontal range.

At the same time the azimuth tracker is maintaining the telescope AT trained on the target in azimuth by the operation of the handwheel AH. The arm E is rotated in azimuth in accordance with the movements of the target from handwheel AH through worm 18 and wormwheel 19, the latter being secured to a sleeve and bracket 112' so that the entire bracket rotates with the wormwheel. Compensating differentials 110, 110' mounted on said brackets 112' are used to prevent change in length of arms E and G due to their orientation. This construction is disclosed in Fig. 9. It will be seen that the elevation gearing extends from gear 16 through a fixed standard 112 to actuate gearing 113—114, the latter operating through differential 110 to gear 115 meshing with rack-bar E. When the entire bracket is rotated in azimuth a gear 120 carried by differential 110 meshing with stationary gear 121 (pinned to stationary sleeve 121' clamped at its outer end to the fixed member 112) will cause the differential to be rotated in an opposite direction and to an equal extent to counteract the movement which is imparted to gear 114 in rotating around gear 113 during such movements in azimuth. A similar construction is provided for operating differential 110'.

It is apparent that the end P₁ of arm E is tracing a horizontal projection of the actual course C of the target on a fixed chart. It is now the problem to set the predicted position of the target at a predetermined later time. For this purpose we cause the end P₁ of arm E to operate a carriage F by means of a pin engaging in a slot 20 in said carriage, said carriage being constrained to move in a single direction fixed in azimuth corresponding to one component of the projected distance of the actual distance traversed (for example, the N—S or E—W component). Thus, if in a given unit of time the target actually travels a distance $t$, its projected distance in the direction of movement of carriage F is $t_1$. We utilize this coordinate of movement of the target in determining predicted position as follows: The carriage F is fixed to a cable 21 operating over rollers 22 which through any suitable gearing operates a rack 23 to move a pen N₁ of a pointer P' laterally across a chart 30, through a pivotal connection 23' which is being moved by any suitable constant speed drive at a velocity V. As the pointer P' traces a component of the course of the target, carriage F is being moved laterally at a constant speed (assuming the target's course and speed to be maintained) which moves the pen N₁ at a constant speed V₁. So that pen N₁ traces a line C₁ on said chart which is a graphic plot of the resultant velocity of the two velocities V and V₁, and there is thus established a ratio $$\frac{V_1}{V}$$

It has heretofore been set forth that the predicted position P₂ must lie in said course a predetermined distance ahead and that this distance is the time of flight as determined by the time it takes the projectile to travel from D to P₂ times the distance travelled by the target per second. Therefore, a second pen N₂ of the pointer P' is set ahead on the moving chart 30 a distance T which represents a certain time, since the chart 30 travels at a given rate. This distance T is determined as follows: When the elevation handwheel EH is operated to obtain the angle of elevation, it operates a second tangent cam TC' which operates through suitable gearing 26 and a time-of-flight cam TFC, which introduces the correct time-of-flight of the projectile for a given altitude and angle of elevation, to scale, to actuate a pin 27 and operate through suitable links and gearing a time-of-flight indicator TFI. A second indicator 28 mounted concentrically to the time-of-flight indicator is adapted to be operated by an operator through a time-of-flight handwheel TFH to move said pointer 28 into coincidence with the time-of-flight indicator. Operation of the handwheel TFH serves to rotate through suitable gearing a screw 32 (see Fig. 1) to move a rack 33 along the chart 30 a distance T. The pen N₂ is thus spaced from pen N₁ a distance equal to the time-of-flight but we know from our theory of operation that the predicted position PP and hence the pen N₂ must lie in the plot C₁ being traced on the chart. Therefore, the rack 33 must be moved laterally across the chart until the pen N₂ is tracing a line in line with the course C₁.

To move the pen N₂ laterally across the chart we provide a suitable pinion rod 34 meshing with the rack 33, said gear being driven from a cable 35 through suitable gearing, and said cable being operated by a second carriage H having a slot 36 in which operates a pin at the outer end of an arm G also pivoted at D. Referring to Fig. 2 it will be seen that said arm G is operated from the elevation handwheel EH at the same time and through similar means, that is, a second tangent cam TC', link 10', lever 13', pin 12', rack 15' and gearing 16' to move the arm G linearly, while said arm is moved in azimuth similarly to arm E at the same time and through similar mechanism from azimuth handwheel AH by gearing 18'—19'. When, therefore, the elevation handwheel EH and the azimuth handwheel AH are operated, both arms E and G are moved at the same time and to the same degree, which means that both carriages F and H move at the same time to move pointers N₁ and N₂ laterally across the chart to the same degree. It is now necessary, however, as described above to move pen N₂ an additional distance laterally across the chart so that said pen will trace a line in the same line as the plot C₁. For this purpose we provide an azimuth predictor handwheel APH which operates upon gearing 18'—19' through a differential 40 so that the additional movement of pen N₂ may be introduced. Operation of handwheel APH, therefore, moves carriage H a certain distance ahead of carriage F and hence moves pen N₂ until pen traces the same line as the plot C₁, in other words, until pointer P' forms merely an extension of the course C₁.

It was stated above that before the azimuth predictor handwheel APH was operated that the arms E and G were coincident and, therefore, the ends P₁ and P₂ of said arms were coincident. By operation of handwheel APH, arm G was moved through an angle so that the end P₂ of arm G is no longer in the course C. It is now necessary that the length of arm G be changed to move pointer P₂ into the line of course C and in order to change this length, that is, the horizontal range, it is necessary to operate the gearing 15'—16' through the tangent cam TC', link 10', lever 13', pin 12' through some distance either more or less than it was operated by the elevation handwheel EH. We, therefore, provide for such movement through an elevation predictor handwheel EPH (Fig. 10) which operates through a differential 42 to impart to the tangent cam which actuates arm G a greater or lesser movement so that the length of arm G is varied until point P₂ is again in line of the course C.

The operation of the elevation predictor handwheel EPH, however, operates on the tangent cam which controls the indication of the time-of-flight indicator TFI to change its position, which makes it necessary for an operator to operate the time-of-flight handwheel TFH to bring pointer 28 again into coincidence with the time-of-flight indicator. Operation of handwheel TFH operates pinion 32 to change the distance T on the moving chart 30 and this will again move pen N₂ slightly out of line with the plotted course C₁. Then the azimuth predictor handwheel must again be operated to move arm G a distance such that N₂ is again in line with course C₁, and movement of arm G in azimuth through the azimuth predictor handwheel APH again moves pointer P₂ out of line of course C necessitating operation of the elevation predictor handwheel EPH to change the length of arm G until point P₂ is again in the line of the course. Operation of elevation predictor handwheel EPH again changes the position of the time of flight indicator TFI and the whole process is continued as before. It will be understood that all of the operators are operating their handwheels simultaneously and not successively, so that a point is quickly reached where the variations introduced by operation of the azimuth predictor APH and the elevation predictor handwheel EPH are zero. Such a system of computing may be termed the flow method by which the correct future position is obtained very quickly although every change in each variable set up alters the setting for the other variables.

It will be seen that the theory of the above operation is essentially to set up a ratio between the unknown velocity of the target (or a component thereof, such as a N—S component in azimuth) and a known velocity, such as that of the moving chart. Thus there is established the ratio $$\frac{V_1}{V}$$

as is apparent from Figs. 1 and 7. It will further be seen that since the predicted position must lie in an extension of the component course that there is set up a ratio through similar triangles, as will also be apparent from Figs. 1 and 7. Thus the predicted position is determined by the ratio $$\frac{V_1}{V} = \frac{T_1}{T}$$

The ratio $$\frac{T_1}{T}$$

is thus in effect a multiplication of the ratio $$\frac{V_1}{V}$$

i. e., both numerator and denominator of the ratio $$\frac{V_1}{V}$$

are multiplied by the same factor to yield the values $T_1$ and $T$. These two facts, first that the operation depends upon setting up a ratio between the unknown component velocity of the target and a known velocity, and second, that the predicted position must lie at a point which is a function of this ratio, are utilized in describing the second form of my invention wherein no actual plot of the course is recorded.

As a modification from the above described operation wherein the predictor arm G is first moved in azimuth and then linearly until its point $P_2$ is again in the course, I may provide a second set of carriages similar to F and H operating in the same plane as said carriages but at right angles thereto, so that said point $P_2$ will be positioned by two coordinates in the plotting plane (i. e. in both the N—S and E—W directions, for instance). Thus, whereas now the coordinate $t_1$ controls the movement of the end $P_2$ of arm G in azimuth, a second coordinate at right angles to $t_1$ and controlled from a second chart similar to chart 30, will operate the point $P_2$ in azimuth in accordance with the other coordinate so that the position of $P_2$ will be fixed without the necessity of actuating the elevation predictor handwheel. This principle is utilized also in the modified form of my invention about to be described.

*The second form of the invention (Figs. 5 to 9 inclusive)*

It will be seen from the above description that in the first form we have actually plotted one component of the course of the target at C and the proportional velocities at $C_1$ and actually positioned a pen further along in said course spaced therefrom by a distance proportional to the calculated time of flight. In the second form of our invention we do not desire to make actual graphic plots of the course and velocities but desire to have the entire operation mechanical. We are enabled to do this by certain mathematical considerations set forth in part hereinbefore. It will be observed in Fig. 1 that we have a chart moving with a constant, known velocity V. Also that the pen $N_1$ is moving in accordance with a coordinate of the movement of the target, also at a constant, but unknown velocity $V_1$. It should further be observed that the plot $C_1$ traces a line at an angle $\phi$ to the ordinate of said chart and that this relation holds true:

$$\tan \phi = \frac{V_1}{V}$$

It will also be seen that pointer P' is merely an extension of the course and that, therefore, it too must take the same angle $\phi$ with the ordinate of the chart, and that of this angle the following holds true: tan $$\tan \phi = \frac{T_1}{T}$$

so that the predicted position as determined by the ratio $$\frac{T_1}{T}$$

is merely a multiplication of the original ratio $$\frac{V_1}{V}$$

The relationships may now be written out as follows:

$$\tan \phi = \frac{V_1}{V}$$

which equals $$\frac{T_1}{T}$$

so that if the relation between the movement of the chart at a given velocity $V_1$ and the movement of a known velocity V is established, then the predicted position PP can be set because $$\frac{V_1}{V}$$

is the tan $\phi$ which equals $$\frac{T_1}{T}$$

and the value T, that is the time of flight, can be determined, leaving only the value $T_1$ to be determined. It is the function of this form of the invention, therefore, to set up a relationship $$\frac{V_1}{V}$$

which will give us the function of an angle $\phi$ and having this function we can determine the value $T_1$, since the value T can be determined. Expressed more simply, the component distances moved by the target along the X and Y axes beyond its present position and during the time elapsing between the firing of the shell and its arrival at the target, are proportional to the resolved rate of movement of the target along each of said axes and to the time of flight of the shell.

Referring to Fig. 13, a point in space $P_1$ (the present position of the aircraft) may be located by its altitude $BP_1$, its angle of elevation $\theta$ and its azimuth relation to some given direction, say angle $\alpha$ with respect to the E—W line or other directional line. In this figure the aircraft is represented as flying along a course 1, 2, 3, $P_1$ at the fixed altitude $BP_1$, and it is assumed that the telescopes on the director have been tracking the target along this line and that the target has maintained the same altitude. The present angle of elevation $\theta$ is measured by the elevation tracker turning the handwheel EH (Fig. 8), which turns the elevation telescope ET, while the present azimuth angle $\alpha$ is measured by a second tracker turning the handwheel AH, which turns the entire director in azimuth around the fixed gear 120 and with it the telescope AT, the two telescopes being tied together so that each is kept on the target. The ground track of the plane will, therefore, be 1'B, and the horizontal range OB (or $\overline{HR}$) may be computed from the right or range triangle $OBP_1$, i. e., $\overline{HR}=BP_1 \cot \theta$, $BP_1$ being the known height ($a$) obtained from any standard height finder.

The predicted ground course will lie along an extension of the line 1'B and the predicted actual course along an extension of the line $1P_1$ so that the future position may be located on said lines at B' and $P_2$, respectively, as follows. According to our invention, we resolve the line 1'B into two components, such as the north-south and east-west directions, determine the rate of movement in each of these resolved directions, and multiply this rate by the time of flight of the shell to locate the coordinates of the predicted point B'. The first of these coordinates is represented by the movement of the line S—S drawn parallel to N—S to the position S'S', a distance equal to the easterly component of the ground distance, while the other component is represented by the movement of the line $S_1 S_1$ through B to $S_1'S_1'$, a distance equal to the northerly component of the ground distance. The intersection of S'S' and $S_1'S_1'$, therefore, locates the point B' and, therefore, the point $P_2$ which lies directly above the same at an elevation $H_0$. Having located the rectilinear coordinates of these points, they may again be converted into the polar coordinates of future horizontal range OB' ($R_p$), future angle of sight elevation ($\theta$) and future azimuth angle ($\alpha'$) and, finally, the corrected gun elevation.

Figure 9A:
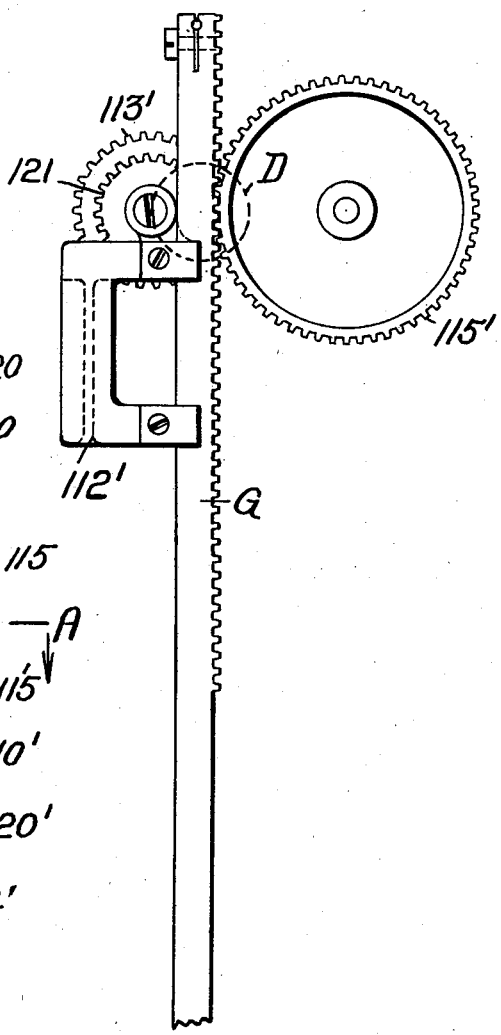
Fig. 9A is a transverse section of the same taken on line A—A of Fig. 9.

In this form of the invention we operate an arm E similar to the arm E of Fig. 1, as before in both range and azimuth so that the outer end $P_1$ of said arm travels an actual course C. For moving said arm E to horizontal range there is again provided the elevation handwheel EH (see Fig. 8) operating through suitable gearing to a tangent cam TC and through an altitude setting device in the form of a sliding bar AC and a link 50 pivoted at 51, the said tangent cam TC operating a pin 52 nearer or further away from said pivot 51 to vary the throw of the opposite end of the link 50 to actuate a rack-bar 53 which operates arm E linearly through suitable gearing. The details of this drive are not shown herein but they may be similar in all respects to the drive shown for driving the corresponding arm E in Fig. 2 and illustrated in detail in Figs 9 and 9A. The azimuth handwheel AH operates as before through suitable gearing 55—56 to rotate the arm E in azimuth. In order that the length of arm E shall not be affected by the rotation of the same in azimuth, the rack bar 53 operates the arm E through a differential 58 adapted to compensate for the said movement of the arm E in azimuth and maintain the relation of said arm E fixed in length with respect to its operating rack 53. The altitude setting device AC is again operated by an altitude handwheel ALH, which is turned until the follow-the-pointer index 121 matches the altitude pointer 122, the latter being set from the height finder as before.

As in the Fig. 1 form, we cause an arm G to be operated at the same time as arm E and to the same degree so that a point $P_2$ at the end of arm G would ordinarily travel a course C similar to point $P_1$. To operate arm G similarly to arm E, we do not provide a duplicate operating mechanism as in Fig. 2 but we cause arm G to be operated from the arm E. For this purpose we cause point $P_1$ to engage in the slots of two right angularly disposed slides S—$S_1$ (see Fig. 5) so that the movement of point $P_1$ of arm E is in effect resolved into its components in two directions at right angles to each other and which are fixed in azimuth. The movement of slide $S_1$ is transmitted through suitable gearing and a differential 60 to a similar slide $S_1$, while the movement of slide S is transmitted also through suitable gearing, including a differential 61, to a second slide S. The said predictor slides at their crossing point are engaged by the end $P_2$ of arm G so that obviously arm G will be moved corresponding to the movements of arm E.

The problem now is to set the point $P_2$ ahead to the predicted position $P_2$. In this instance we do not have a graphic representation of the course and velocity plot so that the point $P_2$ can be set ahead on said course, and we must, therefore, rely upon setting up the relationships described above, that is to say, we must obtain the relation $$\frac{V_1}{V}$$

(component rate) which equals $\tan \phi$ which equals $$\frac{T_1}{T}$$

from which $T_1$ (the change of position) is obtained and hence $P_2$. Since we have resolved the movements of the arms into two components we prefer to operate through each of said components separately to set the predicted position. We will first describe the method of setting one component of the predicted position since the setting of the other component is merely a duplicate both in mechanism and in method and will be obvious from the description of the setting of the first component of predicted position.

The end $P_1$ of arm E is moving slide $S_1$ at a certain unknown velocity $V_1$. This velocity, which is a linear velocity, we translate into rotary velocity through such means as a rack and pinion 65 and bevel gearing 66 to rotate a disc 67 (see Fig. 6) at a velocity which we shall call $V_1$. Mounted in the same axis as the axis of disc 67 is a disc 68 driven from a constant speed motor M, said disc 68 operating through a variable positioned ball 69, cylinder 70 and fixed ball 71 to rotate a plate 72. The ball 69 may be operated radially until a pointer 73 carried by disc 72 is rotating at the same speed as disc 67. The fixed ball 71 is rotating at a radius $r_1$ while the ball 69 is rotating at a variable radius $r_2$. If the radius $r_1$ is taken as unity then the speed of disc 72 is in the proportion $$\frac{r_2}{r_1}$$

Also it is apparent that this ratio $$\frac{r_2}{r_1}$$

is equivalent to $$\frac{V_1}{V}$$

where $V_1$ is the velocity of disc 67 and V the constant speed of the motor M. For setting the position of ball 69 we may mount said ball in a slidable carriage 80, the end of which is in the form of a rod 81 engaging a cam 82 on the shaft of a gear adapted to be operated by a handle 83. Fixed to the same shaft as said cam 82 is an arm 85 and said arm is so positioned on said shaft that when ball 69 is at a distance such that $r_2$ equals $r_1$ the angle it makes with the rod 81 is 45° and the tangent of said angle is, therefore, unity. This would mean in the above equation that the unknown velocity of $V_1$ of the slide $S_1$ is equal to the known velocity of the motor M and that $$\frac{V_1}{V}$$

equals 1 and that $\phi$ equals 45°. As said handle 83 is rotated to change the position of ball 69 to cause pointer 73 to maintain its coincidence with the pointer on disc 67, the angular position of arm 85 varies, that is, the relationship of $$\frac{r_2}{r_1}$$

and hence $$\frac{V_1}{V}$$

varies. In other words, the arm 85 makes with the rod 81 an angle $\phi$, the tangent of which is $$\frac{V_1}{V}$$

provided the cam 82 is so formed as to vary the position of roller $r_2$ in accordance with the tangent of the angle $\phi$, or in other words, the rate of movement of slide S, representing the rate of movement of the target along the Y axis.

Having now established the angle $\phi$ it is possible to determine the component $T_1$ of the predicted position because we know that tan $\phi$ equals $$\frac{T_1}{T}$$

and the value T (or time of flight of the shell) can be determined. For convenience, we cause the angle $\phi$ to be set up by means of a pair of links 86—87, the latter pivoted at 84 so that the arms 85 and 87 are of equal length and form a parallel linkage. Arm 87 will, therefore, make the angle $\phi$ with the slot in 89'. Said arm 87 is slotted and there operates therein a pin 88 extending through the slot of arm 87 and through the slot in arm 89' which is part of a vertically slidable member 89 and the slot 91 of the time-of-flight slide 90 at right angles to slide 89. Since the tangent of $\phi$ equals $$\frac{T_1}{T}$$

and the value T, a side of the triangle, has been set from TFH, pin 88 is therefore, moved in slot 91 a distance equal to $T_1$, thus moving the slide 89 a corresponding distance. Said slide 89 operates through the differential 60 to add to the movement of predictor slide $S_1$ and thus move the end of arm G in one coordinate direction the necessary distance to indicate the predicted position $P_2$.

Figure 5:
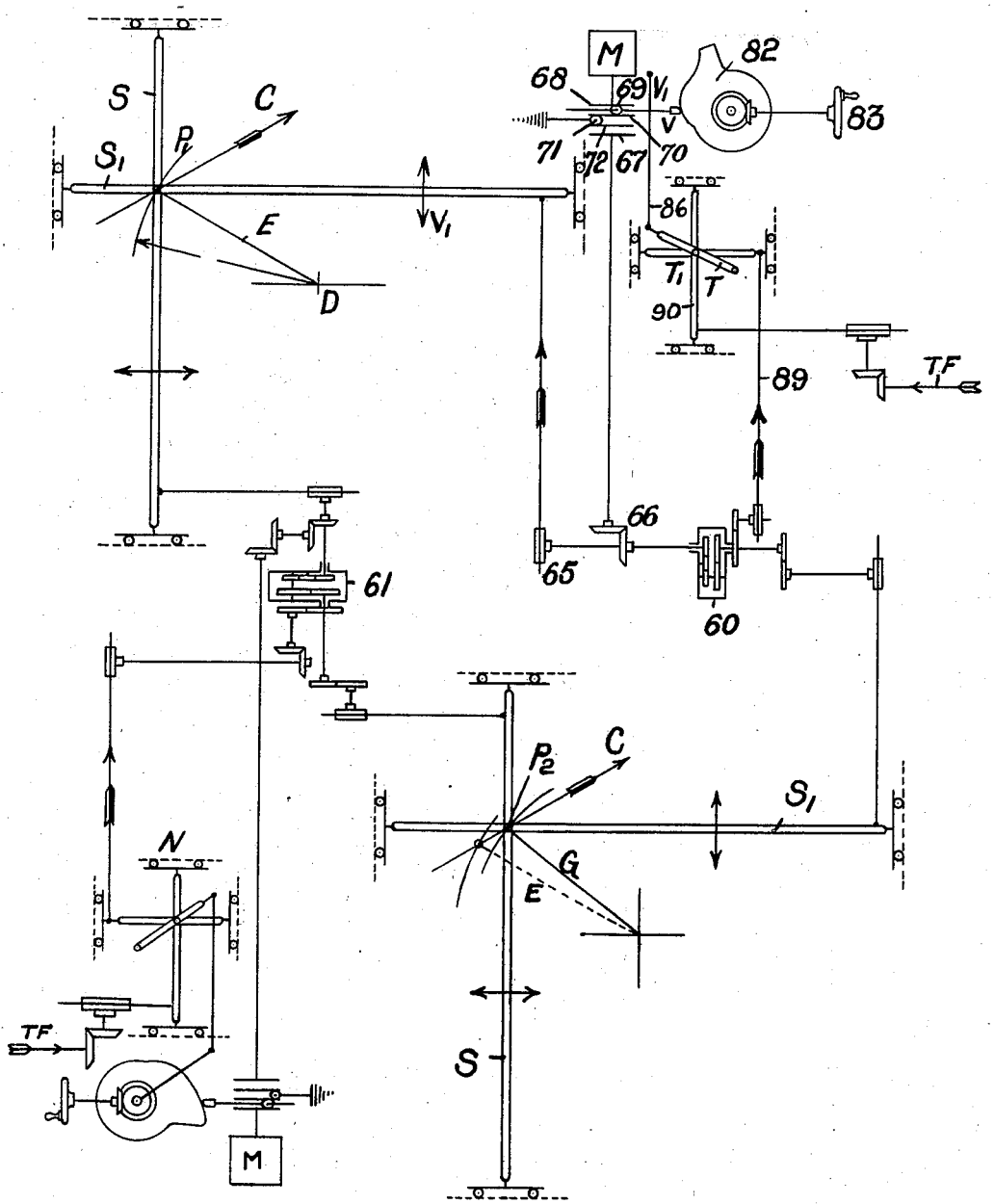
Fig. 5 is a view, largely diagrammatic, of a second form of our invention in which the course is not graphically plotted but is mechanically determined.

Exactly the same operation and mechanism shown generally at N in Fig. 5 is controlled by slide S to impart to the end of arm G the other component of the movement necessary to establish the point $P_2$ (Fig. 5).

The time-of-flight distance T is obtained as follows: Whereas, in the Figs. 1 and 2 form of the invention the time-of-flight was obtained by taking the range, that is, the elevation of which the range is a function, said range being run in from the elevation handwheel, and then combining, the factors, tan $\theta$ and time-of-flight, in the present form the range is taken from the arm G whose length controls a link 53' through a rack and pinion connection 100, said factor operating upon the altitude control AC' and a tangent cam TC' to actuate the time-of-flight cam TFC'. As shown, this is accomplished as follows: The movement of the rack 53' up and down oscillates the link 52' about pivot 51' on bar AC'. Rack 152 is, therefore, moved up and down a distance proportional to the lateral position of the bar AC' as determined from wheel ALH acting through worm and wormwheel 153 and threaded rod 154. Rack 152 in turn rotates the shaft 155 through pinion 156 thus turning tangent cam TC'. Said cam in turn moves the cam follower 160 back and forth to rock the link 157 and with it bevel gear 158 about the shaft of the latter. This rotates the threaded shaft 159 thus positioning the time of flight cam TFC' as stated. It will thus be observed that the same factors enter in the final setting of time-of-flight cam TFC' to operate the pin 27' as entered into the operation of the pin 27 in Fig. 2. That is to say, range as affected by altitude, tangent cam and time-of-flight cam. Pin 27' operates the time-of-flight indicator TFI' as before and the operator operates the time-of-flight handwheel TFH to cause the pointer 28' to coincide with the time-of-flight indicator. Operation of the time-of-flight handwheel causes the operation of slide 90 (through a screw, nut and rack bar (not shown) similar to screw 32, nut and rack bar 33 in Fig. 1) in accordance with the degree of operation of the time-of-flight handwheel to set the distance T. Setting the distance T causes actuation of slide 89 to move arm G to the new predicted position $P_2$ or at least to the component of such position, and movement of arm G works back through link 53', altitude control AC', tangent cam TC', time-of-flight cam TFC' to give a new setting to the time-of-flight indicator TFI'. This requires resetting the handle TFH which again moves slide 90 to change the distance T which again operates slide 89 to change position G and this again works back to change the position of indicator TFI', and this necessitates resetting of handle TFH. This process is repeated by the flow method as in the first form of the invention, all of the operators operating their hand-wheels simultaneously and not successively, so that there is soon reached a stage where the variations are zero. The instrument is provided with suitable dials to show both present and predicted data. Thus the present azimuth angle $\alpha$ is shown on the dial A, which may be directly connected to the handwheel AH and the large gear 120 on which the entire mechanism is mounted. The predicted azimuth angle is shown on the dial A' in accordance with the position of the bar G. The present elevation angle θ is shown on dial E turned from the elevation hand-wheel EH, while the predicted elevation angle θ' is shown on the dial E' which may be mounted on the shaft of the time of flight cam TFC'. This constitutes all the data necessary for hitting the target, neglecting the ballistic data with which this invention is not directly concerned and which may be supplied either mechanically through a ballistic computer or by graphic methods.

In a modified form of the invention shown in Fig. 10, in case it is found that there is too great a load on the arm G in moving the link 53' through the altitude control AC', tangent cam TC' to the time-of-flight cam TFC' to operate the time-of-flight indicator TFI', we may cause the tangent cam TC' to actuate merely a pointer I'. In this form, operation of the elevation handle EH again operates directly through tangent cam TC and altitude correction AC to operate the time-of-flight cam TFC' directly as shown. The elevation predictor handle EPH is then operated through a differential 42 to add or subtract from the elevation handle EH until a second pointer I" is coincident with the pointer I'. This form, it will be recognized is substantially similar to that of Fig. 2.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. A device for computing present and predicted positions of an aerial target consisting in a pivoted arm, means whereby said arm is rotatable in azimuth to correspond to the position of the target in azimuth, means whereby a point on said arm is movable linearly in proportion to the horizontal range, means movable by one component of movement of said point at a velocity corresponding to the component velocity of the target, means movable at a constant known velocity, means for relating said velocities to obtain a ratio, and means for multiplying said ratios by the time of flight to obtain predicted position.

2. A device for computing present and predicted positions of a moving aerial target consisting in a pivoted arm, means whereby said arm is rotatable in azimuth to correspond to the position of the target in azimuth, means whereby a point on said arm is movable linearly in proportion to the horizontal range, means movable by a component of movement of said point at a velocity corresponding to the component velocity of the target, means movable at a constant known velocity, means for relating said velocities to obtain a ratio, means for combining said ratios to obtain component rate, a second arm similarly movable in azimuth and linearly to plot predicted course, and means whereby said rate means operate said second arm to obtain a predicted position.

3. A device for computing present and predicted positions of a moving aerial target including a pivoted arm, means whereby said arm is rotatable in azimuth to correspond to the position of the target in azimuth, means whereby a point on said arm is moved linearly in proportion to the horizontal range, means whereby the movement of said point is resolved into directional coordinate movements, means for determining the velocity of each of said coordinate movements, and means whereby each of said velocities is multiplied by time of flight to determine both coordinates of the predicted position.

4. A device for computing present and predicted positions of a moving aerial target including a pivoted arm, means whereby said arm is rotatable in azimuth to correspond to the position of the target in azimuth, means whereby a point on said arm is moved linearly to correspond to the horizontal range, means whereby the movement of said point is resolved into coordinate movements, means for establishing a ratio between the velocity of each of said coordinate movements and a known velocity, means whereby each of said ratios is combined to determine the coordinates of the predicted position, a second arm and point similarly movable in azimuth and linearly, means whereby said coordinate movements of said first point are transmitted to said second point, and means whereby said computed movements are transmitted to said second point.

5. A device for computing present and predicted positions of a moving aerial target consisting in a pivoted arm, means whereby said arm is rotatable in azimuth to correspond to the position of the target in azimuth, means whereby a point on said arm is moved linearly to correspond to a function of the range, means whereby the movement of said point is resolved into coordinate movements, means for determining the velocity of each of said coordinate movements, means whereby each of said velocities is multiplied by the time of flight to determine the coordinates of the predicted position, a second point similarly movable in azimuth and linearly, means whereby said coordinate movements of said first point are transmitted to said second point, and differential means whereby said computed movements are added to the movements of said second point.

6. A device for computing present and predicted positions of a moving aerial target including a sight for following the target movements, a movable reference member, means for rotating said member from said sight about a center, means for radially moving said member toward and away from said center a distance proportional to the horizontal range, means for determining the linear rate of movement of said member in predetermined directions, a second movable member rotatable in azimuth and movable from the first member, and additional means actuated from said rate computing means for setting said second member an additional distance proportional to said computed rate of movement and the time of flight of the shell.

7. In a system for computing the present and predicted positions of a moving aircraft from a battery, having means for determining the altitude, a sight for following said craft, means for resolving the angular sight movements into azimuth and elevation angles, means for computing horizontal range from the elevation angle and altitude, whereby a theoretical point in azimuth at said range and along the horizontally resolved line of sight may be located, means for determining the rate of movement thereof in one or more component directions, means for multiplying said rates by the time of flight of the shell, means for adding the results to said present position components giving predicted position components, means for combining said components to give predicted horizontal angle and range, and means for finally combining said predicted range and the altitude giving predicted elevation angle.

8. In a system for computing the present and predicted positions of a moving aircraft from a battery which includes means for determining the altitude, a sight for following said craft, means for resolving the angular sight movements into azimuth and elevation angles, means for computing horizontal range from the elevation angle and altitude, whereby a theoretical point in azimuth at said range and along the horizontally resolved line of sight may be located, means for determining the rate of movement thereof in two component fixed directions, means for multiplying said rates by the time of flight of the shell, and means for adding the results to said present position components giving predicted position components.

9. In a fire control directing system for computing the future positions of a moving aircraft from a battery which includes means for determining the altitude, a sight for following said craft, means for resolving the angular sight movements into azimuth and elevation angles, means for computing horizontal range from the elevation angle and altitude, whereby a point in azimuth at said range and along the horizontally resolved line of sight may be located, means for determining the rate of movement thereof in two fixed component directions, means for continuously multiplying said rates by the time of flight of the shell and means for obtaining therefrom by the flow method continuous predicted positions for each present position of the target.

10. In a fire control directing system for computing the future positions of a moving aircraft from a battery which includes means for determining the altitude, a sight for following said craft, means for resolving the angular sight movements into azimuth and elevation angles, means for computing horizontal range from the elevation angle and altitude, whereby a point in azimuth at said range and along the horizontally resolved line of sight may be located, means for determining the rate of movement thereof in one component direction, means for plotting a component ground course from said point and rate as against a known constant rate, and means for locating on said course the predicted component position from the time of flight of the shell.

11. In a fire control director, means for resolving the target's position as observed from the director into fixed rectilinear components, means for determining the rate of movement along each component, and means for combining each rate with the time of flight of the shell to locate the predicted future target position by its components with reference to a predetermined fixed direction.

12. In an anti-aircraft fire control director for batteries, means for resolving the target's position as observed from the director into its horizontal component or ground position, means for resolving the ground position into fixed rectilinear components, means for indicating the rate of movement in at least one of said component directions, means for combining said rate with the time of flight of the shell to locate the future horizontal target position by its component from the battery.

13. In an anti-aircraft fire control director for batteries, means for resolving the target's position as observed from the director into its horizontal component or ground position, means for resolving the ground position into fixed rectilinear components, means for indicating the rate of movement along each component, means for combining each rate with the time of flight of the shell to locate the future horizontal target position by its components from the battery.

14. In an anti-aircraft director for computing predicted positions of an aerial target, means for plotting one component of the course of the target in a horizontal plane, means for determining the rate of movement of the target along said component, and means for setting the predicted position of said target along said component course a distance equal to the time of flight of the projectile to said predicted position multiplied by the component velocity of the target.

15. In an anti-aircraft director for computing predicted positions of an aerial target, means for plotting one component of the course of the target in a horizontal plane, means for determining the rate of movement of the target along said component, means for setting the predicted position of said target along said component course a distance equal to the time of flight of the projectile to said predicted position multiplied by the component velocity of the target, and means for finally determining the predicted elevation angle from said predicted horizontal position and the known elevation.

16. In a fire control director, means for resolving the target's position as observed from the director into fixed rectilinear components, means for indicating the rate of movement of the target along each component, and means for combining each rate with the time of flight of the shell to locate the predicted position by its components.

17. An anti-aircraft director for computing predicted positions of a moving aircraft from a battery, in which the altitude is known, a sight, means for resolving the angular sight movements into azimuth and elevation angles, means for computing horizontal range from the elevation angle and altitude, means for locating a point in azimuth at said range and along the horizontally resolved line of sight, means for determining the rate of movement thereof into component directions, means for continuously multiplying said rates by the time of flight of the shell, and means for obtaining therefrom by the flow method continuous predicted component change of position.

18. An anti-aircraft director for computing predicted positions of a moving aircraft from a battery, in which the altitude is known, a sight, means for resolving the angular sight movements into azimuth and elevation angles, means for computing horizontal range from the elevation angle and altitude, means for locating a point in azimuth at said range and along the horizontally resolved line of sight, means for determining the rate of movement thereof in component directions, means for multiplying said rates by the time of flight of the shell, means for adding the results to said present position components giving predicted position components, and means for combining said components to give predicted horizontal angle and range.

19. In a fire control director, resolving mechanism for converting present range and bearing of the target into rectilinear coordinates, means for computing therefrom the change in each coordinate that takes place during the time of flight of the shell, reconverting mechanism for reconverting rectilinear coordinates into range and bearing, and means for feeding into the same the present coordinates plus the coordinate changes.

20. In a system for computing the present and predicted positions of a moving aircraft from a battery, having means for determining the altitude, a sight for following said craft, means for resolving the angular sight movements into azimuth and elevation angles, means for computing horizontal range from the elevation angle and altitude, whereby a theoretical point in azimuth at said range and along the horizontally resolved line of sight may be located, means for determining the rate of movement thereof in component directions, means for determining the time of flight of the shell including a cam and cam pin having both relative rotary and translatory movements, and positioned as to both movements according to the altitude and another function of the range triangle, and means for multiplying each of said rates by said time of flight.

SHIERFIELD G. MYERS.
EARL W. CHAFEE.